US009761274B2

(12) United States Patent
Delpuch et al.

(10) Patent No.: US 9,761,274 B2
(45) Date of Patent: Sep. 12, 2017

(54) METHOD AND SYSTEM FOR SUSPENDING PLAYING OF MEDIA CONTENT WHILE INTERACTING WITH AN ASSOCIATED INTERACTIVE APPLICATION

(71) Applicant: OpenTV, Inc., San Francisco, CA (US)

(72) Inventors: Alain Delpuch, Paris (FR); Gregory D'Orso, San Jose, CA (US); Jean-Rene Menand, Los Altos, CA (US); Ludovic Pierre, Paris (FR); Steven Szymanski, Mountain View, CA (US)

(73) Assignee: OPENTV, INC., San Francisco, CA (US)

( * ) Notice: Subject to any disclaimer, the term of this patent is extended or adjusted under 35 U.S.C. 154(b) by 148 days.

(21) Appl. No.: 14/268,939

(22) Filed: May 2, 2014

(65) Prior Publication Data

US 2014/0241704 A1 Aug. 28, 2014

Related U.S. Application Data

(63) Continuation of application No. 10/939,114, filed on Sep. 13, 2004, now abandoned.

(Continued)

(51) Int. Cl.
*G11B 27/00* (2006.01)
*H04N 21/433* (2011.01)
(Continued)

(52) U.S. Cl.
CPC .......... *G11B 27/005* (2013.01); *G11B 27/105* (2013.01); *G11B 27/3027* (2013.01);
(Continued)

(58) Field of Classification Search
CPC . G11B 27/005; G11B 27/3027; G11B 27/322; G11B 27/105; H04N 9/87;
(Continued)

(56) References Cited

U.S. PATENT DOCUMENTS 5,625,693 A 4/1997 Rohatgi et al.
5,801,676 A * 9/1998 Maruyama ............ G11B 19/16 715/784

(Continued)

FOREIGN PATENT DOCUMENTS

AU 2004305792 B2 10/2007
EP 0757484 A2 2/1997
(Continued)

OTHER PUBLICATIONS

"U.S. Appl. No. 10/939,114, Appeal Brief filed Jan. 3, 2011", 20 pgs.

(Continued)

*Primary Examiner* — Hoang-Vu A Nguyen-Ba
(74) *Attorney, Agent, or Firm* — Schwegman Lundberg & Woessner, P.A.

(57) ABSTRACT

Disclosed are methods and systems for controlling the playback and recording of television programming containing interactive applications. In one example, a media content item is played for presentation to the user. An interactive application associated with the media content item is available for interaction by a user during the playing of the media content item. During the playing of the media content item, a first indication that the user is interacting with the interactive application is received. In response to the first indication, the playing of the media content item is suspended. During the suspending of the playing of the media content item, a second indication that the user has stopped interacting with the interactive application is received. In response to the second indication, the playing of the media content item is resumed.

20 Claims, 11 Drawing Sheets

Related U.S. Application Data

(60) Provisional application No. 60/502,267, filed on Sep. 12, 2003, provisional application No. 60/502,268, filed on Sep. 12, 2003, provisional application No. 60/502,269, filed on Sep. 12, 2003.

(51) Int. Cl.

| | |
|---|---|
| *H04N 21/472* | (2011.01) |
| *H04N 5/783* | (2006.01) |
| *H04N 21/482* | (2011.01) |
| *H04N 21/2387* | (2011.01) |
| *H04N 21/6587* | (2011.01) |
| *H04N 9/87* | (2006.01) |
| *G11B 27/10* | (2006.01) |
| *G11B 27/32* | (2006.01) |
| *G11B 27/30* | (2006.01) |

(52) U.S. Cl.
CPC ........... *G11B 27/322* (2013.01); *H04N 5/783* (2013.01); *H04N 9/87* (2013.01); *H04N 21/2387* (2013.01); *H04N 21/4333* (2013.01); *H04N 21/47208* (2013.01); *H04N 21/482* (2013.01); *H04N 21/6587* (2013.01)

(58) Field of Classification Search
CPC ........... H04N 21/2387; H04N 21/6587; H04N 5/783; H04N 21/482; H04N 21/433; H04N 21/472083
USPC ............... 386/343, 344, 349, 350, 291, 326; 725/88, 102
See application file for complete search history.

(56) References Cited

U.S. PATENT DOCUMENTS

| | | | |
|---|---|---|---|
| 6,148,081 A | 11/2000 | Szymanski et al. | |
| 6,304,714 B1 | 10/2001 | Krause et al. | |
| 6,363,204 B1* | 3/2002 | Johnson ................ | G11B 19/02 348/552 |
| 6,424,792 B1 | 7/2002 | Tsukagoshi et al. | |
| 6,529,920 B1 | 3/2003 | Arons et al. | |
| 6,757,906 B1 | 6/2004 | Look et al. | |
| 6,853,728 B1 | 2/2005 | Kahn et al. | |
| 6,948,183 B1 | 9/2005 | Peterka et al. | |
| 6,970,641 B1 | 11/2005 | Pierre et al. | |
| 7,137,136 B1 | 11/2006 | Aratani et al. | |
| 2001/0027122 A1 | 10/2001 | Tanaka et al. | |
| 2001/0051037 A1 | 12/2001 | Safadi et al. | |
| 2002/0009290 A1* | 1/2002 | Piesing ................ | H04N 21/235 386/220 |
| 2002/0111812 A1* | 8/2002 | Buchholz ............. | H04J 3/0632 704/278 |
| 2004/0018000 A1 | 1/2004 | Mears et al. | |
| 2004/0028386 A1 | 2/2004 | Walls et al. | |
| 2004/0034874 A1* | 2/2004 | Hord ........................ | H04N 5/76 725/136 |
| 2005/0005306 A1 | 1/2005 | Kim | |
| 2005/0091690 A1 | 4/2005 | Delpuch | |
| 2007/0248319 A1* | 10/2007 | Sakaguchi ............. | A61B 6/461 386/219 |
| 2009/0169172 A1* | 7/2009 | Tsukamoto ............ | G11B 19/02 386/241 |
| 2013/0330059 A1* | 12/2013 | Matsumoto ........ | H04N 21/4722 386/241 |
| 2014/0006032 A1* | 1/2014 | Korn ....................... | G10L 13/00 704/260 |
| 2015/0117831 A1* | 4/2015 | Hanai ...................... | H04N 5/76 386/224 |

FOREIGN PATENT DOCUMENTS

| | | |
|---|---|---|
| EP | 0788106 A1 | 8/1997 |
| EP | 0935251 A2 | 8/1999 |
| JP | 2003513555 A | 4/2003 |
| JP | 2003530033 A | 10/2003 |
| JP | 2004502385 A | 1/2004 |
| JP | 2006502646 A | 1/2006 |
| JP | 2006511016 A | 3/2006 |
| WO | WO-0133847 A1 | 5/2001 |
| WO | WO-2001033847 A1 | 5/2001 |
| WO | WO-2001076249 A1 | 10/2001 |
| WO | WO-0203703 A1 | 1/2002 |
| WO | WO-2002003703 A1 | 1/2002 |
| WO | WO-02091747 A1 | 11/2002 |
| WO | WO-2004034707 A1 | 4/2004 |
| WO | WO-05029836 A2 | 3/2005 |

OTHER PUBLICATIONS

"U.S. Appl. No. 10/939,114, Appeal Decision dated Mar. 5, 2014", 6 pgs.
"U.S. Appl. No. 10/939,114, Decision on Pre-Appeal Brief dated Dec. 3, 2010", 2 pgs.
"U.S. Appl. No. 10/939,114, Examiner's Answer dated Apr. 15, 2011", 19 pgs.
"U.S. Appl. No. 10/939,114, Final Office Action dated Mar. 18, 2009", 22 pgs.
"U.S. Appl. No. 10/939,114, Final Office Action dated Sep. 2, 2010", 16 pgs.
"U.S. Appl. No. 10/939,114, Non-Final Office Action dated Jan. 23, 2008", 14 pgs.
"U.S. Appl. No. 10/939,114, Non-Final Office Action dated May 18, 2010", 14 pages.
"U.S. Appl. No. 10/939,114, Non-Final Office Action dated Jul. 30, 2008", 13 pgs.
"U.S. Appl. No. 10/939,114, Non-Final Office Action dated Oct. 14, 2009", 15 pgs.
"U.S. Appl. No. 10/939,114, Pre-Appeal Brief Request filed Nov. 2, 2010", 4 pgs.
"U.S. Appl. No. 10/939,114, Preliminary Amendment filed Aug. 1, 2006", 7 pgs.
"U.S. Appl. No. 10/939,114, Reply Brief filed, May 19, 2011", 5 pgs.
"U.S. Appl. No. 10/939,114, Response filed Apr. 14, 2009 to Final Office Action dated Mar. 18, 2009", 12 pgs.
"U.S. Appl. No. 10/939,114, Response filed Jan. 14, 2010 to Non Final Office Action dated Oct. 14, 2009", 11 pgs.
"U.S. Appl. No. 10/939,114, Response filed Dec. 1, 2008 to Non-Final Office Action dated Jul. 30, 2008", 12 pgs.
"U.S. Appl. No. 10/939,114, Response filed Jun. 22, 2009 to Restriction Requirement dated Jun. 18, 2009", 7 pgs.
"U.S. Appl. No. 10/939,114, Response filed Aug. 18, 2010 to Non Final Office Action dated Apr. 18, 2010", 10 pgs.
"U.S. Appl. No. 10/939,114, Response to Non-Final Office Action filed Apr. 23, 2008", 13 pgs.
"U.S. Appl. No. 10/939,114, Restriction Requirement dated Jun. 18, 2009", 6 pgs.
"Australian Application Serial No. 2004305792, Non Final Office Action dated Mar. 2, 2007", 2 pgs.
"Australian Application Serial No. 2004305792, Preliminary Amendment filed Jul. 3, 2006", 9 pgs.
"Australian Application Serial No. 2004305792, Response filed Sep. 12, 2007 to Non Final Office Action dated Mar. 2, 2007", 2 pgs.
"European Application Serial No. 04783779.4, Office action dated Sep. 4, 2009", 9 pgs.
"European Application Serial No. 04783779.4, Response filed Mar. 12, 2010 to Office action dated Sep. 4, 2009", 11 pgs.
"European Application Serial No. 04783779.4, Search Report dated Jan. 21, 2009", 6 pgs.
"International Application Serial No. PCT/US2004/029689, International Preliminary Report on Patentability dated Jul. 27, 2006", 5 pgs.
"International Application Serial No. PCT/US2004/029689, International Search Report dated Jun. 30, 2006", 1 pg.
"International Application Serial No. PCT/US2004/029689, Written Opinion dated Jun. 30, 2006", 4 pgs.

(56) References Cited

OTHER PUBLICATIONS

"Japanese Application Serial No. 2006-526340, Final Office Action dated May 18, 2010", W/ English Translation, 8 pgs.
"Japanese Application Serial No. 2006-526340, Final Office Action dated Sep. 7, 2010", W/ Machine Translation, 4 pgs.
"Japanese Application Serial No. 2006-526340, Office Action Received dated Dec. 22, 2009", W/ English Translation, 4 pgs.
"Japanese Application Serial No. 2006-526340, Response filed Apr. 21, 2010 to Office Action Received dated Dec. 22, 2009", W/ Machine Translation, 14 pgs.
"Japanese Application Serial No. 2006-526340, Response filed Aug. 17, 2010 to Final Office Action dated May 18, 2010", W/ Machine Translation, 27 pgs.
"Japanese Application Serial No. 2010-098152, Office Action dated Apr. 24, 2012", W/ English Translation, 4 pgs.
"Japanese Application Serial No. 2010-098152, Response filed Aug. 14, 2012 to Office Action dated Apr. 24, 2012", W/ Machine Translation, 13 pgs.
"Japanese Application Serial No. 2011-000195, Examiners Decision of Final Refusal dated Oct. 22, 2013", W/ English Translation, 5 pgs.
"Japanese Application Serial No. 2011-000195, Office Action dated Apr. 24, 2012", With English Translation, 5 pgs.
"Japanese Application Serial No. 2011-000195, Office Action dated Nov. 20, 2012", With English Translation, 4 pgs.
"Japanese Application Serial No. 2011-000195, Response filed Feb. 19, 2013 to Office Action Nov. 20, 2012", W/ Machine Translation, 7 pgs.
"Japanese Application Serial No. 2011-000195, Response filed Aug. 14, 2012 to Office Action dated Apr. 14, 2012", W/ Machine Translation, 15 pgs.

* cited by examiner

METHOD AND SYSTEM FOR SUSPENDING PLAYING OF MEDIA CONTENT WHILE INTERACTING WITH AN ASSOCIATED INTERACTIVE APPLICATION

RELATED APPLICATIONS

The present application is a continuation of U.S. patent application Ser. No. 10/939,114, titled "METHOD AND SYSTEM FOR CONTROLLING RECORDING AND PLAYBACK OF INTERACTIVE APPLICATIONS," filed Sep. 13, 2004, which claims benefit of priority to U.S. Provisional Application No. 60/502,267, titled "INDEXING OF DRIPPED A/V STREAMS FOR PLAY," filed Sep. 12, 2003; to U.S. Provisional Application No. 60/502,269, titled "APPLICATION PLAYBACK CONTROL FOR PERSONAL VIDEO RECORDERS," filed Sep. 12, 2003; and to U.S. Provisional Application No. 60/502,268, titled "SEAMLESS INTERACTIVE TELEVISION USING A RECORDING DEVICE," filed Sep. 12, 2003.

FIELD OF THE INVENTION

The invention relates generally to digital broadcasting systems and methods, and more specifically to control and playback of programs containing interactive applications.

BACKGROUND

Interactive television systems provide a means to deliver interactive content as well as ordinary television audio and video programs to a large number of subscribers. Programs broadcast by these systems may incorporate television audio and video, still images, text, interactive graphics, data, executable applications, locators, metadata and many other components. The interactive content of the interactive television program may therefore include application code, data associated with the audio and video, control signals, additional audio and video, still images, text, raw data, internet addresses and many other types of information.

Interactive content such as application code or information relating to television programs is often broadcast to a receiver, retrieved on demand from one or more servers at a remote site, or stored locally. In an on-demand interactive system, a return path is necessary for sending requests from a client to a server and subsequently retrieving the interactive content from the server. Once retrieved from the server, the supplemental content is received by the receiver and displayed on the same screen concurrently with the audio video program or may, alternatively, replace the audio video program, for example. Alternatively, a second device (such as a PC, PDA, web tablet, web phone, etc.) can be used to present the supplemental content. Further, while the interactive application can be fetched-on demand and forwarded over the same transmission service as the broadcast program, it could also be fetched and forwarded to the receiver station from a separate network. For example, the interactive application could be fetched and received from an online information provider, such as the Internet, while the audio video program is received over a conventional broadcast cable system.

When interactive content is broadcast, the interactive content is usually broadcast in a repeating format. In other words, each piece of information is broadcast a first time, then each is transmitted a second time, and so on. The cycle is repeated so that each piece of interactive data is transmitted, for example, every ten seconds. The pieces of information which are broadcast in this manner form what is referred to as a "carousel." The sequence of information that makes up the carousel can be prepared in advance, or it can be determined "on the fly."

Broadcast systems (e.g., interactive television systems) transmit information in a carousel format in order to allow receivers in the system to selectively obtain particular pieces of information in the carousel without requiring a return path from the receivers to the server. If a particular receiver needs a particular piece of information, it can simply wait until next time that piece of information is broadcast to obtain the information. If the information were not cyclically broadcast, the receiver would have to transmit a request for the information to the server, thus requiring a return path. Other receivers in the system can operate in the same manner, each receiver waiting for the information it needs, and then using only that information. By employing carousels to broadcast information, the system eliminates the need to connect each of the receivers with the server and further eliminates the need for the server to process individual requests for information.

If information needed is not cyclically broadcast, the receiver, if equipped with a suitable modem, could transmit a request for the information to a server, using what is called a return path. Other receivers in the system can operate in the same manner, each receiver waiting for the information it needs, and then using only that information.

The pieces of information, or data objects, in a carousel are often intended to be combined to form a single program. For example, an interactive television game show may combine audio, video and interactive content, such as application code which allows users to answer questions and compete against each other. The application code may be downloaded along with the data for the quiz show for example, or may reside locally, either on the device used to process the data or somewhere accessible on a home network, for example. Another example of an enhancement would be a news program which combines audio and video with application code that inserts current stock prices in a banner at the bottom of the screen. (It should be noted that many types of programs are possible, and it is not necessary to include either audio, video or interactive content in any particular program. A program might contain only audio and interactive data (e.g., an interactive radio program,) or it might contain only interactive data (e.g., an interactive weather program that does not contain audio or video streams.)

Various recording and playback devices, such as personal video recorders (PVRs), have been developed and commercialized in recent years allowing a viewer to "fast-forward", "rewind", "replay" or "pause" an audio video program when the viewer of the broadcast is monitoring the programming concurrent with its reception. These systems typically use memory devices such as a hard disk for storing the audio video program and playing back the program with near-perfect quality.

A control device on a typical PVR, for example, maintains the addresses of segments of the recorded program in the memory device, so they can be reassembled in the proper sequence for playback. Audiovisual display is controlled by user interaction. The control device is responsive to commands received from the viewer. Control of such a memory device to implement the various desired functions set forth above ate well known within the skill in the art.

The problem with current interactive television systems is that because a viewer controls the audiovisual display by viewer interactions, if a viewer wants to interact with an enhancement due to an interactive application, the audiovisual program will continue playing notwithstanding the viewer's lack of attention. In this manner, the viewer may miss portions or an entire commercial, for example, unless the viewer immediately upon interaction with the interactive TV application specifically commands the program to stop and then later indicates that they desire to resume viewing of the program. Even if the commercial continues to play on the screen, the viewer is now expressing interest elsewhere.

Accordingly, a need exists for a system and method that allows a viewer to interact with an interactive application without missing material in the currently played audiovisual program.

Another problem is that current PVR systems are not adequately designed to handle enhanced programming when using "trick" modes. Prior to the advent of PVR technology, it was safe for applications to assume that they always were run at the same time as they were broadcast, and that the program they are a part of progressed as a constant and well-understood rate. Therefore, many existing applications have explicitly or implicitly included assumptions that these facts are true, and will not run properly if they are played back at a different time or different rate from how they were originally broadcast, e.g., trick mode operations. Trick mode operations are basically any operation which change the speed or direction from normal forward playback. This also includes setting the playback to a different playback position. These assumptions are not a strict either-or proposition. Some applications may be able to handle some changes in these parameters and not others (for instance, an interactive application may be able to handle being played fast-forward, but not rewound; or an interactive application may be able to handle being played back at a later date, but only if it is played back at a constant rate).

In addition, some interactive applications will only be able to handle these changes if they remain in control of when and how the changes occur—doing their own processing of the pause, play, rewind, and fast-forward keys. This is potentially at odds with the network's interests to control those behaviors, either to ensure consistency or to support particular business models (like paying extra for the right to fast-forward through commercials). However, even with such networks, there may be a few applications that the network trusts to do their own trick-mode processing.

Further, because the program may include different interactive applications which are in various states throughout the program, it is necessary to maintain the proper states for these applications, even when parts of the program are skipped in special playback modes. Further, the applications may interact with other data objects, so it may be necessary to generate signals that would not otherwise be generated in a special playback mode.

It is possible to write applications that properly handle special modes, as long as the application receives proper notification of any changes in the location/rate of playback. However, this takes some effort on the part of the application developer, and not all developers will be willing to make the effort to support all special modes. Thus, it becomes necessary for the system to take action to handle applications that am unable to handle trick modes.

Yet another problem with current PVR systems is that they are unable to adequately integrate the use of "trick" modes when recording variable rate streams. The use of trick modes typically requires metadata that indicates the correspondence between play-time and location of the data on the recording media. For example, if a user wishes to use a trick mode to jump ahead 30 seconds into the programming, metadata that indicates where to jump to on the recording medium is required.

The usual approach for keeping track of the correspondence between play-time and location of the data on the recording media is to maintain a map from play time to stream offset (or file location). Consequently, the ability to randomly access through the file can be facilitated by maintaining a table of times and offsets, where in order to access to time T in the stream, the file must be played from the offset O. Thus, a file can be considered as having an ordered list of pairs T(t), O(i) for the stream. Normally, it is not difficult to build such an ordered list within a set top box when the stream is being sent at the rate at which it is meant to be played back. This is because the correspondence between T(i), O(i) follows a single formula. However, when the stream is being "dripped" at a variable rate, the correspondence is not constant. Accordingly, a need exists for determining the correspondence between play-time and location of the data on the recording media for a program recorded at a variable rate.

SUMMARY OF THE INVENTION

To solve the above and other aspects, the present invention provides a system and method for using a recording device to automatically delay or time shift a program, such as an audio video program, for the typically variable length of time necessary to allow interactions desired by the viewer. The present invention provides a system for controlling the playback of an audio, video and/or other content as the viewer begins to interact with an interactive application, which may contain code and data. Once the viewer is done interacting, the program is resumed where it left off.

With respect to the present invention, it does not matter if the interactive application, including code and content, is broadcast to the receiver station as part of the same service as the audio video program, is fetched from local storage, or separately fetched on demand from a server at a broadcast or from an online information provider. Moreover, the invention covers combinations of the above where the interactive content is retrieved with the interactive code or separately from local storage, external storage to the receiver station (such as a PVR), from a device on the home network, from a broadcast station, from a LAN, private network, Internet or other online information provider.

In the method of the present invention, the program is played back from a local recording device, which could be in a set top box or external to the set top box, or is received from a broadcast. The receiver station begins to play an interactive application, containing code and content data. Upon receipt of a viewer command indicating that the viewer desires to interact with the interactive application, display of the program is automatically stopped. In the case of the broadcast program, a command is sent to the storage device to begin recording the program. In the case of the prerecorded program, the recording device is commanded to cease outputting data associated with the audio video program. Further, the device maintains a pointer at the memory location where the audio video data was stopped for later recall. Upon completion of the viewer interaction with the interactive program, the receiver station automatically resumes playing the audio video program.

Thus, a further object of the present invention is to provide an automatic time shift of a broadcast program being played concurrently with its reception at a receiver station upon viewer interaction with an interactive application and subsequent resumption of the broadcast program when the viewer is done interacting.

Another object of the present invention is to provide an automatic time shift of a pre-recorded program being played from a memory storage at a receiver station upon viewer interaction with an interactive application and subsequent resumption of the pre-recorded program when the viewer is done interacting.

Yet another object of the present invention is to provide a system and method for determining what kind of playback options "trick" modes an interactive application can handle. The system preferably can allow some interactive applications to handle some of their own playback options. Alternatively or in addition, the system preferably is configured to determine what playback options are approved to be used with the interactive applications allows a user access to access these approved options.

A further object of the present invention is to provide flexibility to networks in how they handle PVR functionality as it relates to interactive applications.

Yet a further object of the present invention is to provide a method of simplifying the processing required at the receiver to determine the correspondence between play time of recorded variably dripped content and location in the storage media.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE DRAWINGS

The invention can be understood by reference to the Detailed Description of the Invention when taken together with the attached drawings, wherein.

DETAILED DESCRIPTION OF THE INVENTION

Personal Video Recorders (PVR) allow viewers to record selected television programs on command. Viewer can then determine when to view the recorded programs. In addition, PVRs typically allow the viewer several features "trick" modes. One such trick mode is the ability to pause and rewind during the recording of a live broadcast. The recorded portion may then be viewed later or skipped to catch up to the real-time broadcast. Another possible use of the PVR is to record one television show while playing back another, previously recorded show. Typically, the PVR achieves these feats by recording compressed video signals on storage devices such as hard-disk drives so that they can be played back on command.

The storage devices are typically part of the viewers system. They can be integrated in the viewer's receiver/set-top box or they can be part of a separate component of the viewer's system. Alternatively, the storage device can be located at a remote location away from the viewer's location. A so called "network PVR" works by placing the storage device at a remote location, for example the location of a broadcaster. A user is then able to control playback by communicating with the broadcaster over a network. The recorded programming can be provided to the viewer through the network or through another medium. Many embodiments described herein make specific reference to PVRs located at tire viewers location and integrated into the viewers set-top box. These embodiments are meant only to be exemplary. Many of the principles apply equally to network PVRs and other storage systems used for recording and controlling the playback of television programming.

Interactive television systems provide a means to deliver interactive content as well as ordinary television audio and video to a large number of subscribers. Programs broadcast by these systems may incorporate television audio and video, still images, text, data, locators, metadata, interactive graphics and applications, and many other components. The interactive applications of the interactive television signal may therefore include application code, data associated with the audio and video, control signals, raw data, internet addresses and many other types of information. Disclosed are systems and methods for integrating interactive programming into PVR systems.

Figure 1:
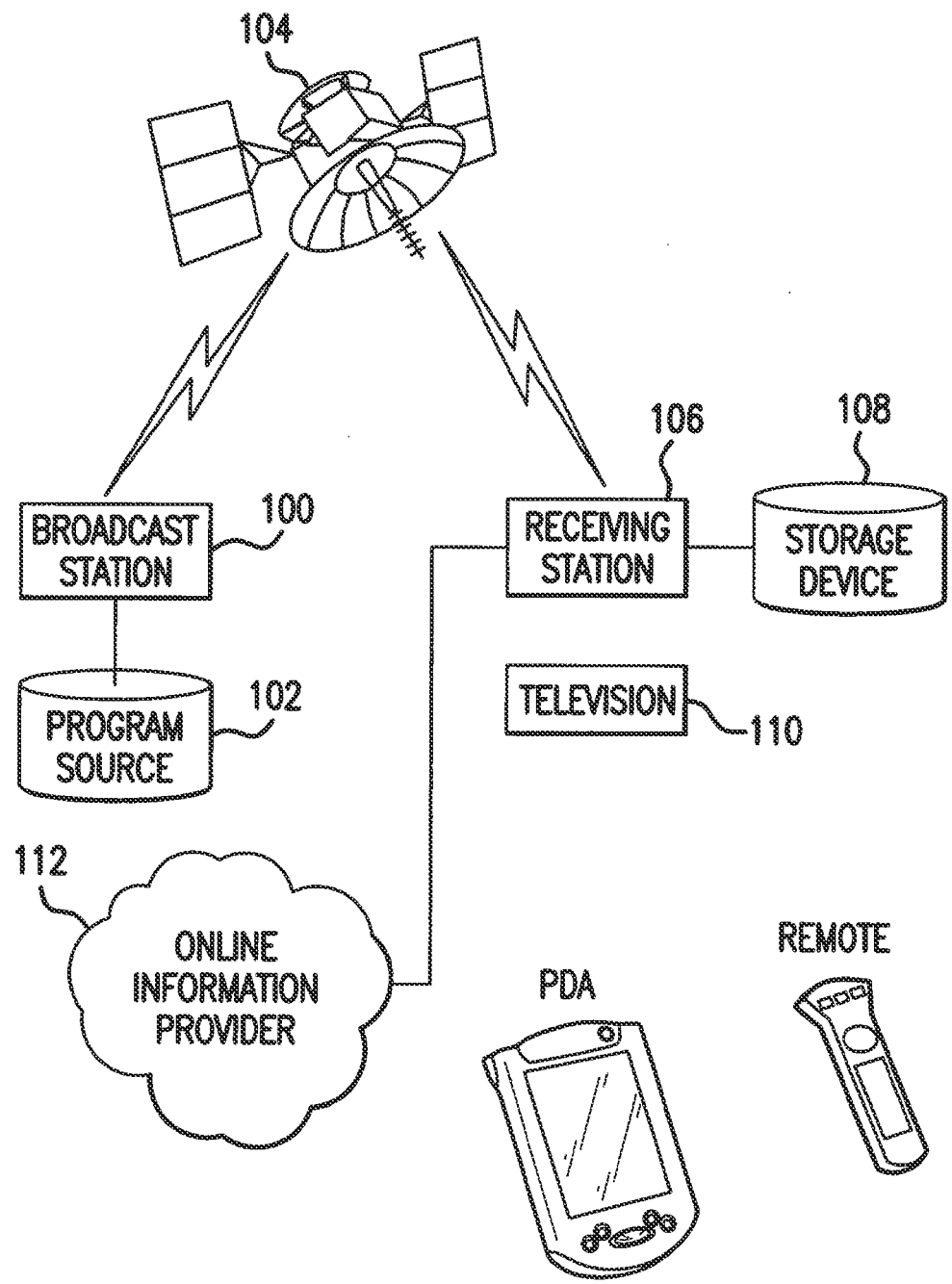
FIG. 1 is a functional block diagram of an interactive television system.

Referring to FIG. 1, a functional block-diagram of an interactive television system is shown. The interactive television system generally comprises a broadcast station 100 and a receiving station 102 coupled to the broadcast station 100 by a broadcast medium 104. In this figure, the broadcast medium 104 is depleted as a satellite transmission network. The broadcast medium 104 may, in other embodiments, comprise other transmission means such as cable, telco, MMDS (microwave) and terrestrial transmission media. Broadcast station 100 is coupled to a program source 102 which is configured to provide the data which forms the program. The program source 102 could also be an operations center which broadcasts the data to a cable headend.

Receiving station 106 includes a receiver which is preferably coupled to a recording device 108. Receiver 106 is typically implemented in a set-top box which is connected to a television 110. Alternatively, the receiving station 106 could be integrated into the television. The receiving station could also be a PC with the computer monitor substituting for the television. Alternatively, the television could be used for display of the primary program and the PC (or PDA, web phone, etc.) for playing the interactive application including code and data, commonly know as a "two box" configuration. In any event, the present invention is operable and covers without limitation any receiving apparatus known in the art.

Receiving station 106 incorporates a control unit (e.g., a microprocessor,) a memory, and other components which are necessary to select and decode the received interactive television signals. Because the basic components and features of receiving stations 106 such as set-top boxes are known, they will not be discussed in detail here. Recording device 108 is a conventional personal video recorder (PVR), the operations of which are within the skill in the art.

Typically, set-top boxes are designed to provide the necessary interactive functionality at a minimal cost. Consequently, they normally have a limited amount of memory and no mass storage devices (e.g., hard disk drives.) While the memory is sufficient to execute interactive applications, it is not adequate to store the applications for an indefinite period of time. Therefore, the applications do not normally remain in memory when they are no longer being executed.

Even if the memory of the set-top box were large enough to stole some interactive applications, it might still be too small to accommodate a program which includes large amounts of audio or video data, application code, or other information. In one embodiment of the present system, recording device 108 is coupled to the set-top box to provide sufficient storage to record programs that will not fit in the limited amount of memory in the set-top box. Recording device 108 may comprise any suitable storage device, such as a hard disk drive, a recordable DVD drive or optical disk drive. It can be internal to the set-top box, or it may be connected externally. Recording device 108 can be connected permanently or removably to the set-top box.

Interactive applications such as application code or content relating to an interactive television program can be retrieved at the receiving station 106 in many different ways as understood by one skilled in the art. The interactive content and/or code could already be resident in storage at the receiving station 106. The interactive content and/or code could be stored at the broadcast station 100 and broadcast to the receiving station 106 with or as part of the audiovisual primary program, as discussed in more detail below in relation to "carouselling". Alternatively, the interactive content may be stored at a different location from the interactive code and when the interactive code is executed, the interactive content could be fetched from a server at the broadcast station 100, online information provider 112, home network, amongst other locations. For example, the interactive content could be stored at a server associated with an online information provider 112 (e.g., the Internet, Web, Intranet, public network, private network, etc.) and could be retrieved from the receiver station during the playing of an audiovisual program. For example, a program may include, or be accompanied by, triggers which when extracted are used by the receiving station 106 to access the interactive content and/or code. In one such embodiment, the triggers could be addresses or reference addresses for one or more sites on an online information provider network. At certain predetermined times or when received and extracted from a datastream at the receiving station 106, these triggers can be used to either automatically or upon user command establish a communications link with the online information provider 112 site for the retrieval of interactive program.

As referred to above, interactive applications can also be broadcast in a repeating format. In other words, each piece of information is broadcast a first time, then each is transmitted a second time, and so on. The cycle is repeated so that each piece of interactive data is transmitted, for example, every ten seconds. The pieces of information which are broadcast in this manner form what is referred to as a "carousel." The sequence of information that makes up the carousel can be prepared in advance, or it can be determined "on the fly."

Broadcast systems (e.g., interactive television systems) transmit information in a carousel format in order to allow receivers in the system to selectively obtain particular pieces of information in the carousel without requiring a return path from the receivers to the server. If a particular receiver needs a particular piece of information, it can simply wait until next time that piece of information is broadcast to obtain the information. If the information were not cyclically broadcast, the receiver would have to transmit a request for the information to the server, thus requiring a return path. Other receivers in the system can operate in the same manner, each receiver waiting for the information it needs, and then using only that information. By employing carousels to broadcast information, the system eliminates the need to connect each of the receivers with the server and further eliminates the need for the server to process individual inquests for information.

In one embodiment, the data objects of a program which are to fee broadcast from broadcast station to receiving station are stored at the same source as used to store the program. The data objects may be stored separately (e.g., as independently accessible files,) or they may be stored as a preconstructed data stream. If the data objects of the program are stored as individual files, they are retrieved by broadcast station from program source to be sequentially broadcast. If the program is stored as a preconstructed data steam, the stream can be broadcast essentially as it is stored. The program data may be compressed and control information may be added to the data for use by the interactive television system. The program data and any additional information is then converted by broadcast station to a format suitable for transmission over broadcast medium. In this particular embodiment, the data is formatted into packets which can be transmitted over a digital satellite network. These packets may be multiplexed with other packets for transmission.

Broadcast station transmits the data objects of the program in a carousel which is cyclically transmitted to receiving station. This produces a stream of data in which each data object is transmitted repeatedly. It should be noted that the broadcast medium (a digital satellite network in this embodiment) can support a number of different channels, and that different carousels (and corresponding data streams) can be concurrently broadcast on these channels. When receiving station receives the data stream, the program contained in the data stream may be played immediately or it may be recorded. If the program is to be played immediately, receiving station converts the data stream back into the data objects and uses them as necessary in the program. If the program is to be stored, it may be parsed into the individual data objects and stored as a set of files, or it may be stored as a data stream, as it was received. If the program is to be stored, it is conveyed to a recording device. The program may be stored whether if is immediately played or not.

Figure 2:
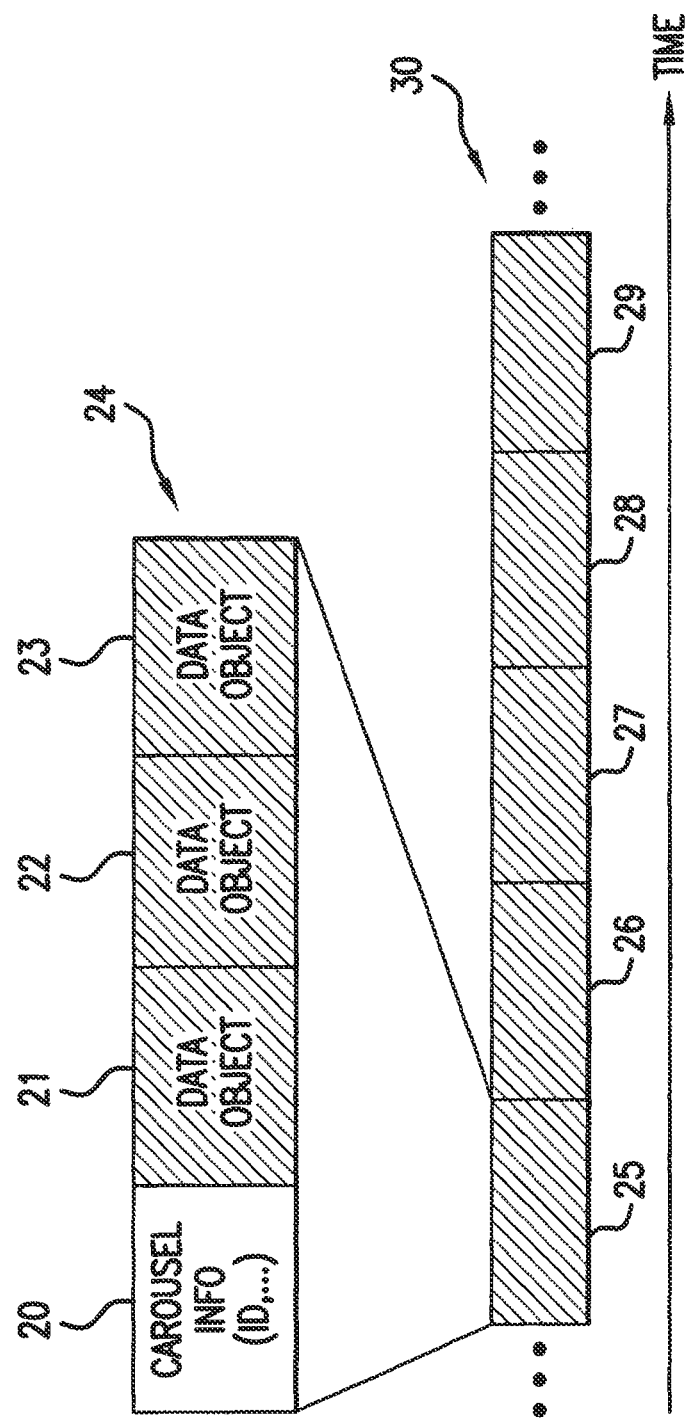
FIG. 2 is a diagram illustrating the structure of a carousel and a corresponding data stream.

Referring to FIG. 2, the structure of a carousel (and a corresponding data stream) which is transmitted to the receiver is illustrated. Carousel 24 comprises data objects 21-23 and carousel information 20. Data objects 21-23 are retrieved from the same source as the program as described-above. Carousel information 20 is provided by the broadcast station and may contain information such as the carousel ID and version number, the validity range of the carousel, a file access table or directory for the carousel, and various other information. (Portions of this information, such as validity range data, are not necessary in programs which are intended for immediate consumption.). The broadcast station transmits carousel information 20 and data objects 21-23 sequentially. The first instance of the transmission of carousel 24 is indicated by 25. After the broadcast station has completed transmission of the first instance of carousel 24, it is transmitted again, as indicated by 26. The successive, cyclical transmissions of carousel 24 indicated by 25-29 form data stream 30. Transmission of the carousel may be repeated indefinitely.

As mentioned above, the data objects which comprise a program may include application code, audio and video data, control signals, raw data and other types of information. If the program is to be immediately consumed (i.e., presented to the user,) the data must be parsed to extract the data objects from the stream. When the necessary data objects have been extracted, the program is played. The data objects are used as defined in the program. For example, any applications which need to be executed are launched, any audio or video data which needs to be presented to the user is played or displayed, any signals which need to be produced are generated, and so on. The program is presented to the user, typically via a television, and is consumed. Regardless of whether or not the program is immediately presented to the user, it can also be stored. The recording device can be used to store programs "as is" (i.e., as a data stream which is essentially the same as that received in the broadcast signal) or as a set of files that can be individually accessed or updated. In either case, the recorded program can be played back. The present system and method are employed to facilitate and/or enable the use of playback features such as trick play modes when viewing the recorded program. To illustrate the advantages of the system and method, it may be useful to examine the structure of a program.

Switching from Programming to Interactive Applications

Figure 3:
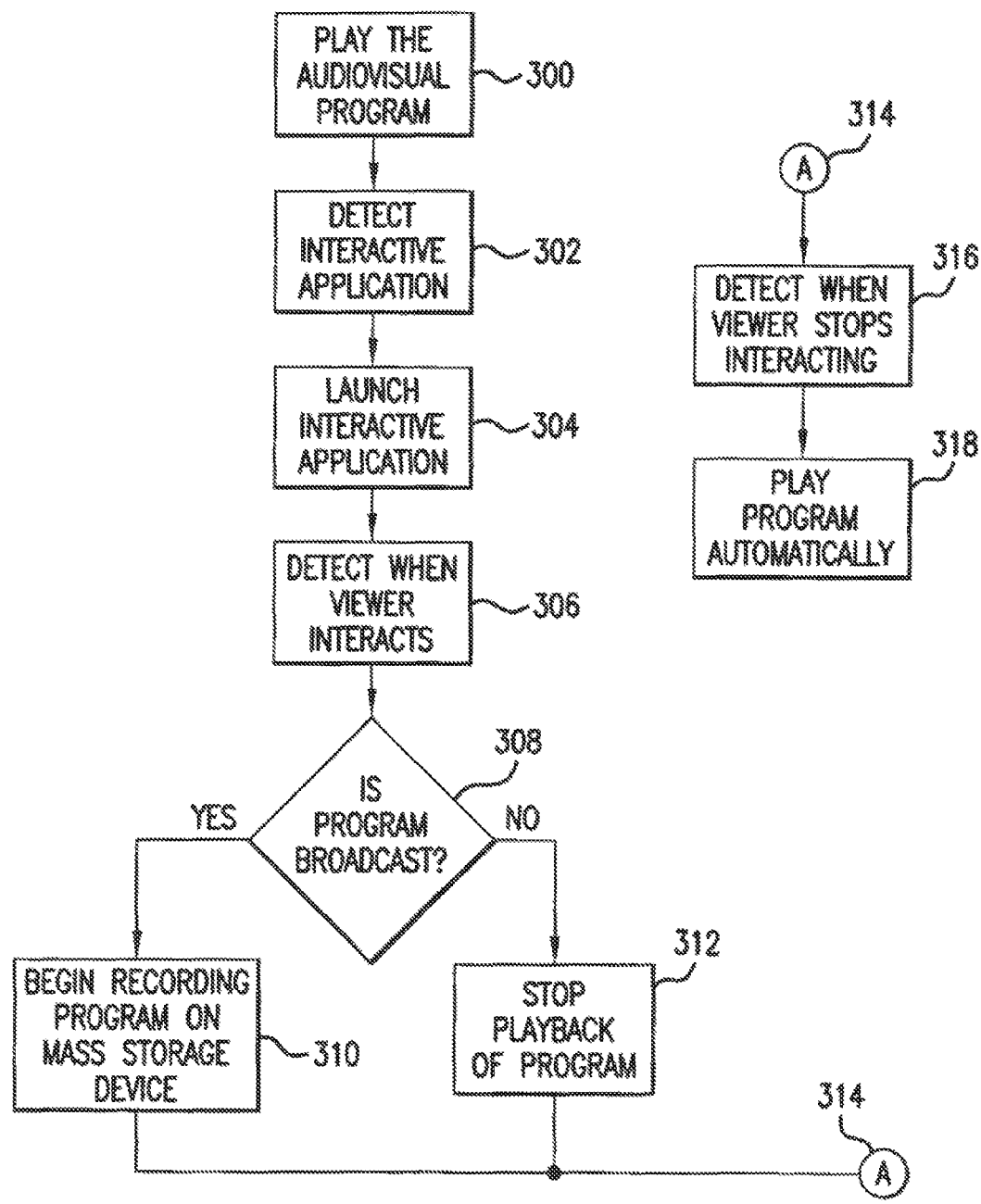
FIG. 3 is a flow diagram illustrating one method for controlling the playback of recorded programming mat includes an interactive application.

FIG. 3 is a flow diagram illustrating one method for controlling the playback of recorded programming that includes an interactive application. The method is described with reference to an "audiovisual" program. However, the present invention is not limited to a program containing audio video content that could include any of the following, separately or in combination; audio, video, graphics, data, text, metadata, interactive application, locators, amongst other components.

Referring again to FIG. 3, and particularly with respect to the prerecorded program, after the program is recorded on a recording device, playback of the program is initiated at 300. If the interactive application is contained as part of pre-recorded program, the receiver is configured to detect applications in the recorded data at 302. The manner in which applications are detected in the program depends upon how the program was stored.

If the application was recorded as a data stream, the receiver detects an application by examining the sequential stream of data which is played back from the recording device. When the stream contains information indicating that the application is available, the receiver detects this information and thereby detects the application. The application is then launched at 304.

If the program was recorded as a set of files, the detection of applications in the program proceeds in a different manner. When playback of the program is initiated, the receiver examines the stored files. In one embodiment, the application files include information defining validity ranges for the corresponding applications. The receiver compares the validity range for each application to a current playback index. If the current playback index falls within the validity range of a particular application, that application is considered to have been detected, and is launched.

Alternatively, the interactive program could be wholly separate from the pre-recorded program. For example, a trigger could be detected in the pre-recorded program which would allow the interactive application to be accessed and launched according to one of the methods set forth above. For example, the interactive application, which could include code and data, could be stored in local storage at the receiver station, at the broadcast station, or at an online information provider site. If stored at the broadcast station, a request must be sent on the return path back to the broadcast station whereby the interactive application is accessed from a server, for example, and subsequently broadcast to the receiver station where it is detected and launched. In yet another embodiment, an icon or other indicator could be presented to the viewer indicating that an interactive application is available. Upon viewer command, the interactive application could be retrieved from local (i.e., storage within the receiver station) or external storage (storage remotely located from the receiver station including broadcast station or online information provider) and launched.

In another embodiment, several applications may reside on the receiver or on some other consumer electronics device attached to the receiver. In this case, the application to be launched, possibly automatically without even requiring user intervention, might be determined by the type of data in the stream. A typical example of such an application and associated data would be a web browser and some xml data.

Referring again to FIG. 3, when either the application is detected in the program or retrieved separately from internal or external storage, the interactive application is launched at 304. Once launched, the viewer may choose to interact with the presentation by selecting an option presented as part of the interactive application. For example, the viewer could select a possible answer to an interrogatory presented as part of a graphics overlay on a video program. For example, a commercial could be running and the viewer could respond affirmatively to an interrogatory presented on a graphics overlay asking if the user would like more information on the product presented in the commercial. Alternatively, an icon could be presented on the screen indicating to the viewer that enhanced content is available. The viewer could respond by any means known by those skilled in the an including without limitation depressing a key on a remote or keyboard, speaking a voice command to be processed by voice recognition component in the receiver station, amongst other ways.

Once the viewer command is detected by the system at 306, an interrupt could be sent to the interactive application. In other words, a control task or another native or broadcast process could receive notification of a key event that is directed to the interactive application. For example, in some systems, multiple applications may reside on the receiver. Some of those applications may execute natively (consisting of executable code for the particular processor in the receiver) whereas others of them may use an interpreter or virtual machine in which to execute. A control task is a particular type of application that can be furnished by the network operator or by the consumer electronics manufacturer. In either case, the primary objective of the control task is to decide matters of "policy." Examples of decisions that could be made by a control task include (1) which events can be delivered to which other applications and which they will handle directly; (2) which applications will be allowed to access certain peripherals such as the tuner or modem; and (3) whether to terminate particular applications when resources are running short. These are just a few examples of the types of policies which a network operator and/or consumer electronics manufacturer may wish to establish via a control task. In any case, a control task may execute natively or inside an interpreter or virtual machine.

In FIG. 3, after detecting a viewer interaction a determination of whether the audio video program is a broadcast or recorded program is made at 308. If the audio video program is broadcast and currently played upon reception, a command is sent from the receiver station to the recording device to begin recording the audio video program at 310 if the broadcast program was not already being recorded in the recording device. If the broadcast program is continuing to be recorded, the read point of the location of the video and/or audio in the recording device where the viewer started interacting is maintained by the system.

Referring to FIG. 3 with respect to the broadcast program, a command is sent from the processor in the receiver station to the audio, video and/or data decoder to stop playing out the program at 312 resulting in the removal of the video from the screen and stopping the play of the audio content from the speakers. Of course, ceasing playback of the pre-recorded program from the recording device provides the same result of stopping the play of the program.

Any content, whether graphics, text, stills, voice and/or audio, associated with the interactive program preferably is continued to be played on the screen or speakers. The system preferably has a way to ensure that if the interactive application includes video or audio data that the content will continue to play, preferably without interruption. One way to ensure interactive play is through the use of metadata indicating which content should be "paused" and which content should continue playing for the viewer. Metadata can be associated with segments of content for use by the system. This metadata may be received at the receiver station as part of signaling information, as part, of the content or as part of an application. Alternatively, a table, such as an Event Information Table, can be retrieved by the receiver station which indicates event states and control flow.

In an alternative embodiment, instead of pausing the program during user interaction with the interactive application, the program is played in a loop along with the interactive application. For example, if the interactive application appears during commercial programming, the commercial containing the application can continued to be played along with the application, when the commercial ends, the programming could be paused or the programming could be looped back to the beginning of the commercial and the commercial could be played again while the viewer interacts with the application.

Referring to FIG. 3, the next step 316 is to detect when the user stops interacting with the interactive application. This could be accomplished by the interactive application calling an exit routine or by receiving a command from the viewer indicating their intent to terminate the session. Typically, computer programs or applications can be written to be either finite in length or infinite (in case they sit in a loop waiting for a network signal, key depression, etc.) Finite applications typically end either with the programmer including a specific call to an exit routine or simply syntax that indicates the end of the application. In the latter case, when the program is compiled or interpreted, a runtime library is typically linked in which will call the exit routine. The exit routine is typically reflected to the operating system or middleware so that such can reclaim the resources that were being used by that application. With this invention, part of the process involved within the operating system or middleware exit routine may be to resume a video, and/or other interactive application (see FIG. 4). An example where the viewer controls the exit would be the following. The viewer may be retrieving additional information about a product in a commercial from the interactive application. When completed, the interactive application can present a query or "termination" icon on the screen which the viewer could click on by depressing a key on a remote, for example. Another alternative would be to allow the viewer a certain time period to interact. If the viewer does not interact within such period, the system detects that a user has stopped interacting. It is understood as within the skill of the art that there are many ways tor determining when a viewer has stopped interacting with the interactive application.

Referring again to FIG. 3, once the system detects the viewer has stopped interacting at 316, a command is sent to the recording device to retrieve the program. Preferably, the read point of the location of the video and/or audio in the recording device is maintained by the system. For example, the programming could then begin playing again on the screen from the same point where it was stopped (i.e., where the program was originally "paused") at 318. Alternatively, the program could begin playing at any point automatically identified by control commands, by an event information table, or by viewer manipulated remote control which permits the viewer to select the portion of the recorded program to be viewed, for example.

Figure 4:
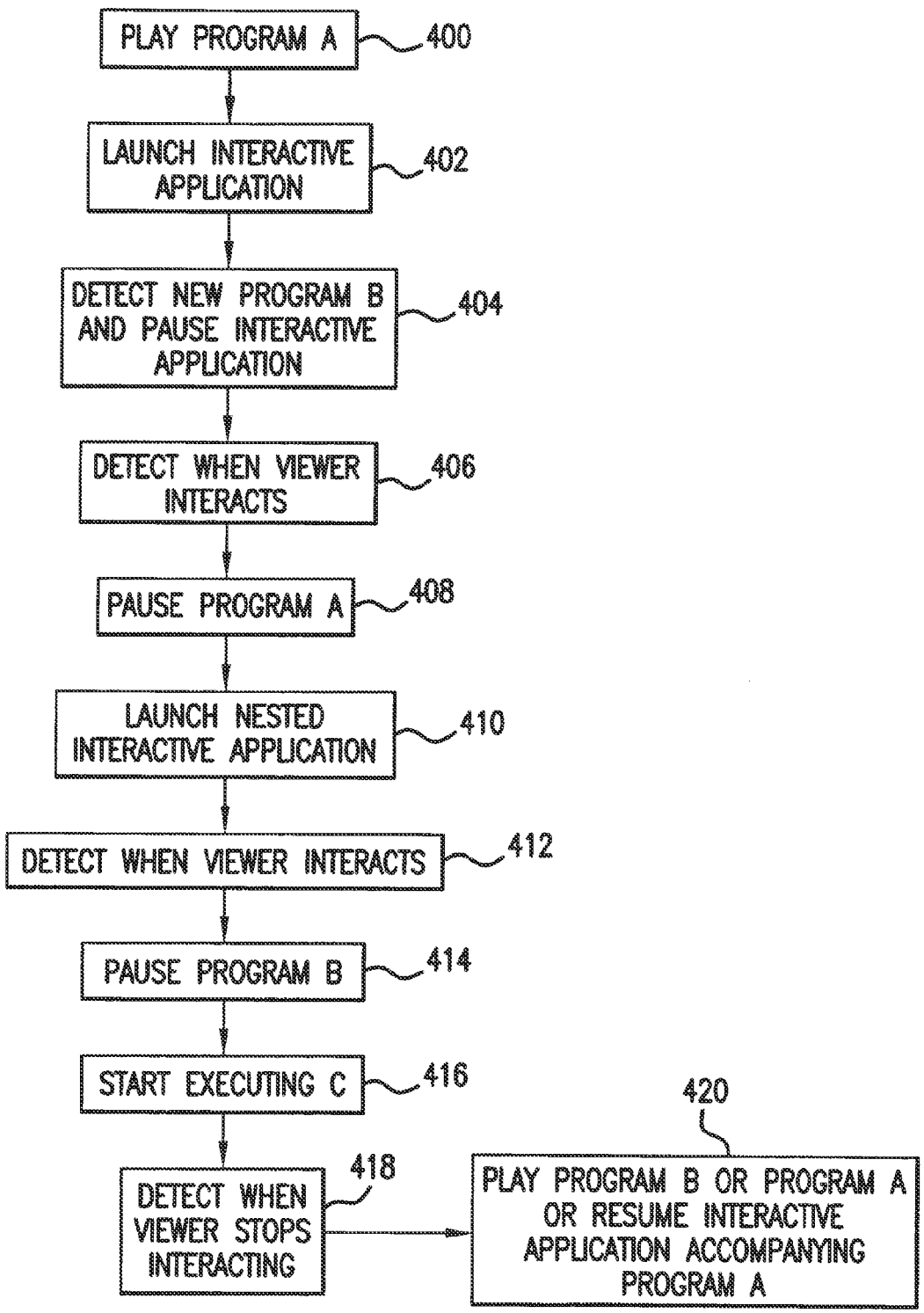
FIG. 4 is a flow diagram illustrating an embodiment of the present method in the case where there is more than one event.

The present invention also pertains to "nested recordings" as shown in FIG. 4. This is the case, for example, when a viewer interacts with an application accompanying a television program, then views a commercial and requests additional information about a product advertised in the commercial. After requesting the information, they may return either back to the commercial or the program, where the choice of where to return may be set by the network operator, the supplier of the content, the supplier of the software that runs on the receiver, or set as a default by a customer. For example, a viewer could be watching audiovisual program A at 400, which could include an interactive application. The viewer can choose to launch the interactive application at 402. When a new interactive program B is detected at 404, which, for example, includes an interactive application, it is launched and displayed to the viewer, perhaps in a picture-in-picture or side-by-side arrangement with program A.

At this point, the interactive application that accompanies program A can be "paused." For example, the system may pause program A automatically when the viewer chooses to interact with the interactive application B at 408. When the viewer interaction is detected by the system at 406, the receiving station automatically ceases playing program A and effectively "pauses" program A, perhaps also pausing an application associated with Program A at 408. The viewer is now watching audio visual program B which contains another interactive application C, which is then launched at 410. If the viewer now indicates their desire to interact with interactive application C at 412, program B stops playing automatically at 414 and ineffectively "paused." The system now starts executing program C at 416. When the receiving station determines that the viewer stops interacting with interactive application C at 418, the play of either program A, program B or the interactive application accompanying program A can be automatically resumed and displayed on the screen for the viewer at the point where it was previously paused at 420.

Playback Options of Interactive Applications

Applications included in programming can pose a problem when the programs are recorded using, for example a PVR or other storage device. This is because some programs are designed to ran only when originally broadcasted. In addition, systems may not be designed to handle special "trick" modes that are available during playback of recorded programming including applications.

Figure 5:
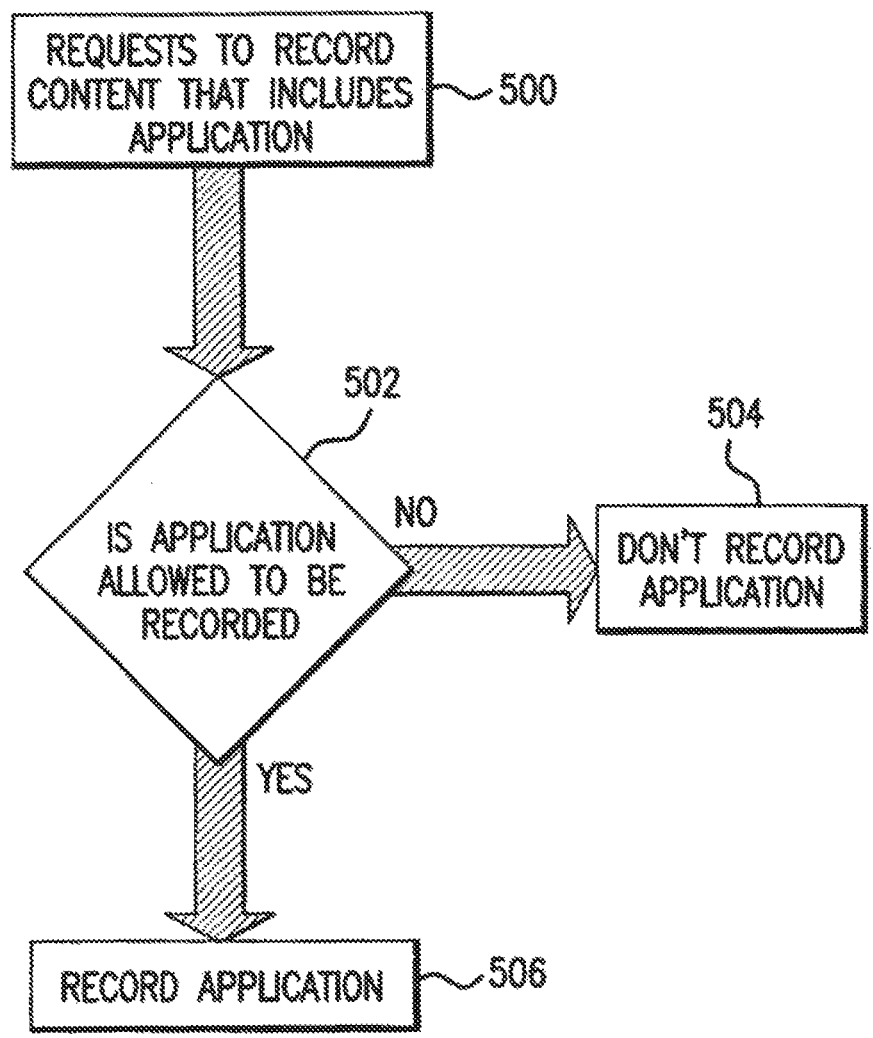
FIG. 5 is a flow diagram showing how a recording system cm handle a request for recording content that includes an application.

FIG. 5 is a flow diagram showing how a recording system can handle a request for recording content that includes an application. As stated above, some applications do not allow for being run at any time other than their original broadcast time. Such applications should not therefore be recorded. According, the application's data may include an indicator as to whether the application is allowed to be recorded. If no such indicator exists, then even if someone requests that the application be recorded, it will not be. This indication can be included in the Carousel information 20 described above, or in other data in the stream. For instance, if the program was being broadcast using MPEG standard transport, a descriptor in the PMT could be used to signal that recording is allowed.

In FIG. 5 a request to record content that includes an application is made at 500. Software on the recording system then checks to determine whether recording the application is allowed at 502. If recordation of the application is not allowed, the system will not record the application at 504. Alternatively, the system can determine whether recording the application should nonetheless be allowed. The system may still, however, record the programming content without the application. If recordation of the application is allowed, the system records the application at 506.

Figure 6:
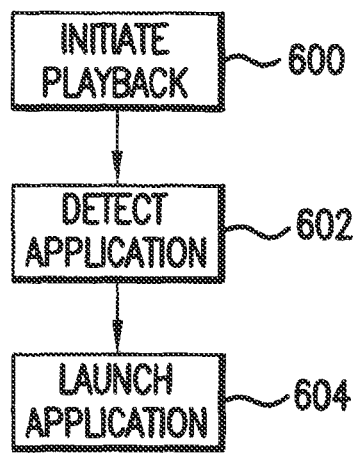
FIG. 6 is a flow diagram showing a method for initiating playback of recorded applications.

FIG. 6 is a flow diagram showing one method employed by the interactive television system described above for initiating playback of recorded applications. After the program is recorded on the recording device, playback of the program is initiated at 600. The receiver is configured to detect applications in the recorded data at 602. When an application is detected in the program, the application is launched at 604. The manner in which applications are detected in the program depends upon bow the program was stored.

Figure 7:
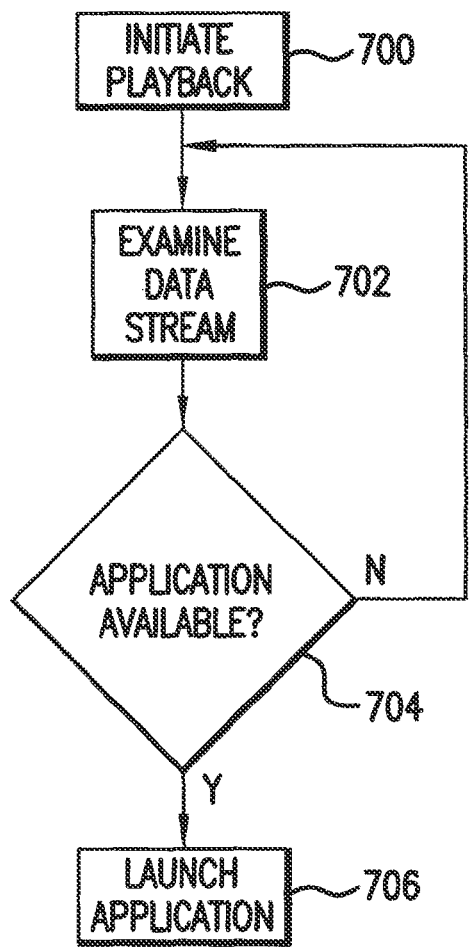
FIG. 7 is a flow diagram illustrating the detection of an application in a system configured to receive a program as a data stream is shown.

FIG. 7 is allow diagram illustrating the detection of an application in a system configured to receive a program as a data stream is shown. If the application was recorded as a data stream, the receiver detects an application by examining the sequential stream of data which is played back from the recording device at 702. When the stream contains information indicating that the application is available, the receiver detects this information and thereby detects the application at 704. If the applications is available it is launched at 706.

Whether the program was stored as a data stream or as a set of files, the detection of applications continues as the program is played back. Thus, as new applications are detected, they are launched. It should be noted that the capabilities of the receiver and the policies implemented in the execution environment of the receiver determine the effect on a currently executing application of launching another application. Preferably, as described above, programming and other applications are paused when a new application is launched. It may or may not be necessary to unload the first application from memory while the second application is executing. If the receiver can simultaneously execute more than one application, then the second application may be launched while the first application continues to run. The receiver may, however, implement a policy which prohibits executing applications simultaneously. The receiver may therefore be required to kill or suspend the first application upon launching the second, even though the receiver is capable of executing both.

As mentioned above, when a user plays back a program, he or she may wish to use special playback modes rather than simply playing the program back sequentially (i.e., in a normal play mode.) The special modes include trick play modes, such as fast-forward, slow motion and rewind, and may also include jump, seek and pause features. When special play modes are used, the program moves from a first point at which an application is in a first state (e.g., showing a particular graphic) to a second point at which the application should be in a second state (e.g., showing a different graphic.) Because the portion of the program between the first and second points is not played (or executed,) certain signals and events which would normally cause an application to modify its state are not encountered. Care must therefore be taken to ensure that the behavior of the application resulting from use of the special play mode corresponds to the position in the program after the special play mode is stopped. In many cases, the author of the application will implement the application such that it is resilient to some or all of the trick modes, while other trick modes may cause undesirable behavior if not signaled.

Figure 8:
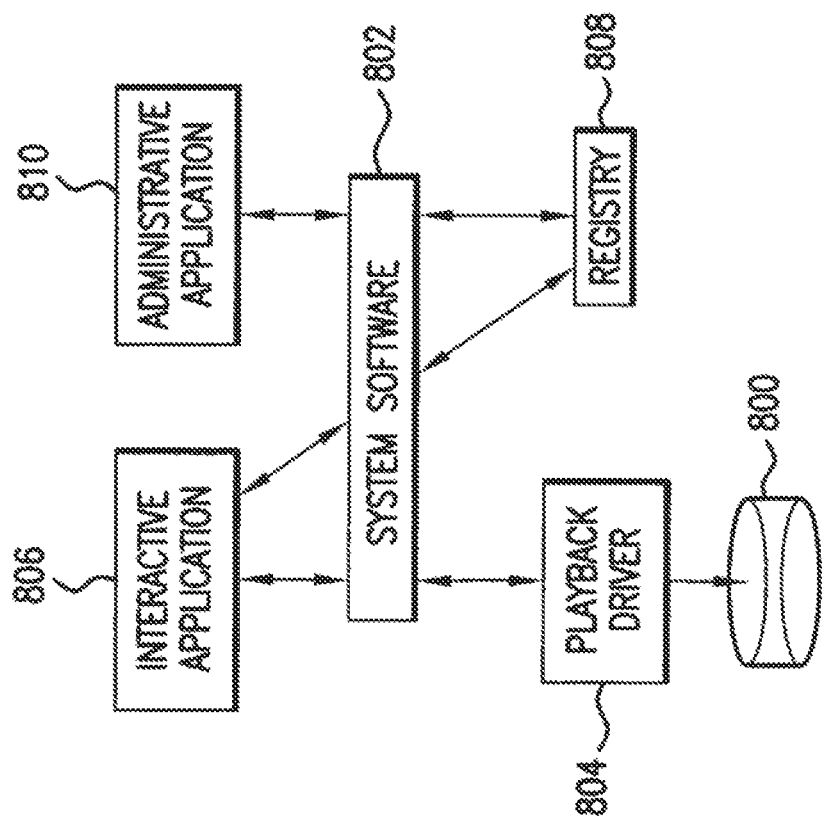
FIG. 8 is a diagram showing how playback of programs containing applications can fee controlled.

FIG. 8 is a diagram showing how playback of programs containing applications can be controlled. Television programs with associated interactive applications are stored on the recording device 800 for playback at the viewer's convenience. System software 802 implements all the functions normally associated with this type of device, such as controlling drivers for peripheral devices and subsystems, as well as implementing the operating system. FIG. 8 illustrates three special sub-components, namely the playback driver 804 which controls the playback of the content, a registry 808 that maintains information about the capabilities of the application 806, and, an administrative component 810 that handles policy decisions for the system. The administrative component 810 can be implemented in several ways including as an application, as a 3rd party extension to the system, or built into the system itself. The application 806, in conjunction with the system software 802, registers its capabilities and rights.

The registered capabilities include what trick modes it is able to handle at the moment. This can be implemented as a static mechanism where the information is stored in the description of the application (in the Carousel information 20 described above, or in other data in the stream. For instance, if the program was being broadcast using MPEG standard transport, a descriptor in the PMT can be used to signal that recording is allowed.) In this case the capabilities are read by the system and registered accordingly. Alternatively (or in addition to the static mechanism), this can be a dynamic process where the application can, as it runs, change what trick modes it is prepared to handle by using an interface provided by the system to change the current capabilities. So it might never handle rewind, and only handle fast-forward through certain parts of the program.

This dynamic change in behavior can be applied to all special playback modes available in the system.

The rights registered with the system include whether or not it has the right to handle requests from the viewer to perform trick modes. Generally the viewer will indicate that they want to fast-forward by pressing a "fast-forward" key on their remote (although other mechanisms are possible). The signal that the viewer pressed that key could be processed in two ways—either the system handles it, invoking the trick mode accordingly, or the signaled key press can be passed on to the application to let the application do what it wants with it (which may not be to fast-forward the recorded program). The former provides consistency of behavior, while the latter give the application the ability to enhance the behavior of the system. Since many broadcasters have a strong interest in consistency, they may want to maintain control of what applications process trick mode requests, so the ability to process such signals is a right that is granted to applications.

The registration of this right with the system can be implemented in several ways. It can be described in the Carousel information 20 described above. See U.S. Pat. No. 5,625,693, "Apparatus and method for authenticating transmitting applications in an interactive TV system," incorporated here in its entirety by reference for all it teaches, for a description of defining applications permissions in a signed application directory. Alternatively, the application can register a credential that authorizes the application. See U.S. Pat. No. 6,148,081, "Security model for interactive television applications," incorporated here in its entirety by reference for all it teaches, for a description of using credentials to establish rights. Alternatively, the rights could resident in memory on the STB. For example, they could be distributed by the Conditional Access System normally used to control access to Premium pay services such as HBO or Pay-per-view movies. Furthermore, if an application has the right, to handle these signals, it still may not desire to handle them all the time, so art additional step may be employed where an authorized application makes a request to the system to send trick mode requests signals to the application, and can later request that the system resume handling those signals itself.

FIG. 8 shows the playback driver 804 in communication with the application 806, again in conjunction with the system software 802. At fixed intervals or at instances of state changes, and at other times of its choosing, the driver 804 will send a message to the application 806 concerning its current state, Illustrative messages might be, for example, "Normal Play", "Fast-forward", "Fast-forward 10×", "Stopped", etc.

The administrative component 810 may also override the capabilities of the application 806 based on its own criteria. For example, some features may be disabled at different times, such as, the application 806 may register that it is fast-forward capable, but the administration 810 may register that it wants the playback driver 804 to disallow that feature for some reason.

Figure 9:
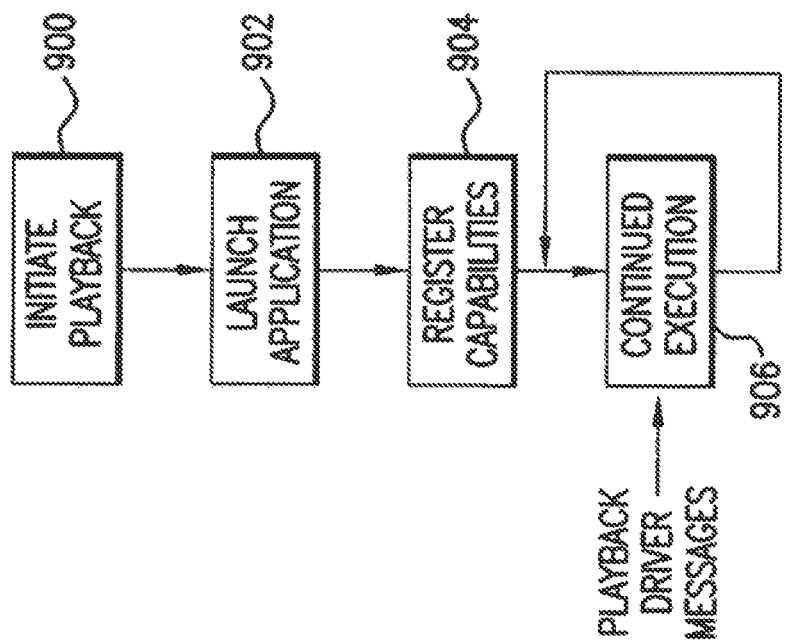
FIG. 9 is a flow diagram illustrating how playback of applications are handled.

FIG. 9 is a flow diagram illustrating how playback of applications are handled. First, playback is initiated at 900 and an application is launched at 902. After playback is initiated, a starting set of capabilities of the application are registered at 904. Execution of the application then begins. During its continued execution at 906, the application will receive, via any of several methods (interrupt, polling, shared memory, etc.), messages from the playback driver concerning its state. The actions taken by the application will vary depending on the effect desired by the author. For example, some applications may choose to remove all graphical overlays from the screen during a Fast-forward Operation, and may not redisplay overlay elements after Normalplay resumes and new data is acquired from the stream. Alternatively, a different type of application may be designed predominately for use during Trickplay during which most "normal" applications cannot provide meaningful applications. For example, consider a Fast-forward bookmarking application, where in the user watches a TV program during Fast-forward, hitting select when the fast-forward video content is "interesting." Information sent to the application by the PlayBack Driver, concerning the speed of playback, the position of the PlayBack Index, etc. could be used to build a bookmark list, possibly in conjunction with other MetaData in order to rapidly move from marked scene to marked scene. For example, previewing an entire football game in FastMotion, marking the proximate positions of all long pass plays is possible. When combined with MetaData of the precise times when plays begin and end, an application could prepare a playlist of the long-pass plays.

It should be pointed out that some applications may depend on live data reception to maintain their state. When a special playback mode is used to cause an application to move to a particular point in the playback of the program, precautions may be taken to ensure that the application is in the appropriate state after the program returns to a normal playback mode. This can be addressed for two different cases: cases in which applications were authored with the intent that they would be recorded and played back; and cases in which applications were not intended to the recorded and replayed.

In the first case, an application is produced with the knowledge that it maybe recorded and played back using special play modes. Such an application is designed to accept notifications of these special play modes and to accommodate them. For example, an application can be configured to generate a query to determine the current position in the playback of the program. The application could then set its internal state according to the position in the program. In the second case, and application is produced with the intent that it should be consumed as it is received. The application is not designed to jump from one position to another in the program except as the program progresses in a normal play mode. In either case, a request for a trick mode not currently handled by the application may occur.

Figure 10:
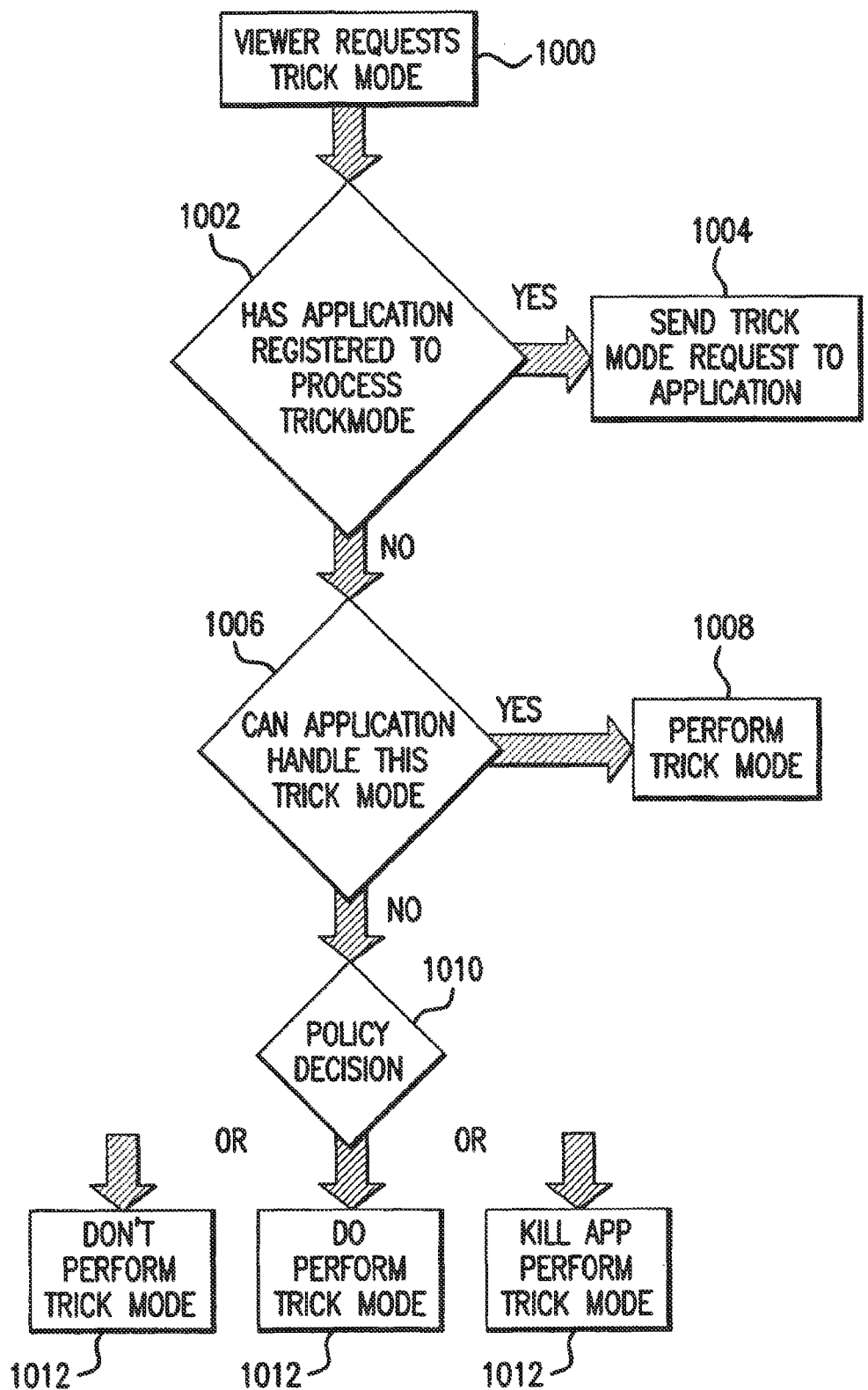
FIG. 10 is a diagram illustrating how the system handles trick mode request signals.

FIG. 10 is a diagram illustrating how the first case is handled. First, the viewer requests a trick mode at 1000. The system then determines if the application has the right to handle trick mode request signals (key presses) and if it has requested them at 1002. If so, the signal is sent to the application at 1004, and it is up to the application to handle the situation. If the system is handling the trick mode signals, it determines if the application can currently handle the specific trick mode requested at 1006. If it can, the request is processed normally at 1008. If the application has registered that it cannot currently handle the trick mode, then the administrative component is informed of the decision and is allowed to take appropriate action at 1010. Options 1012 for the administrative component include (but are not limited to): killing the application and letting the trick mode occur, allowing the application to run and ignoring the trick mode request, and letting the trick mode occur but allowing the application to continue to run. If the administrative component does kill the application it further has the option to restart the application once the trick mode is exited.

The application may be allowed to save information (e.g., state information) to persistent storage such as the recording device when it is terminated. It should be noted that the application may be removed from memory when it is terminated, so it may have to be downloaded again from the data stream and restarted after the program has jumped to the new position.

Recording Variable Rate Streams

Programming streams can be transmitted at variable rates depending upon the available bandwidth. When viewing the programming as it is broadcasted this does not become a problem because the system can play back the streams at a constant frame rate. However, when the streams are recorded before playback on a PVR or other recording devices, the variable rate of the streams can pose problems daring playback. Specifically, playback on PVRs often uses trick modes that allow a user to skip ahead or back in the broadcast a predetermined amount or play the streams in fast-forward or reverse. To use trick modes with variable rate content metadata that indicates a correspondence between play-time and location of the data on the recording media is typically required.

This metadata can be generated in a variety of manners as described below with reference to FIGS. 11-13.

Figure 11:
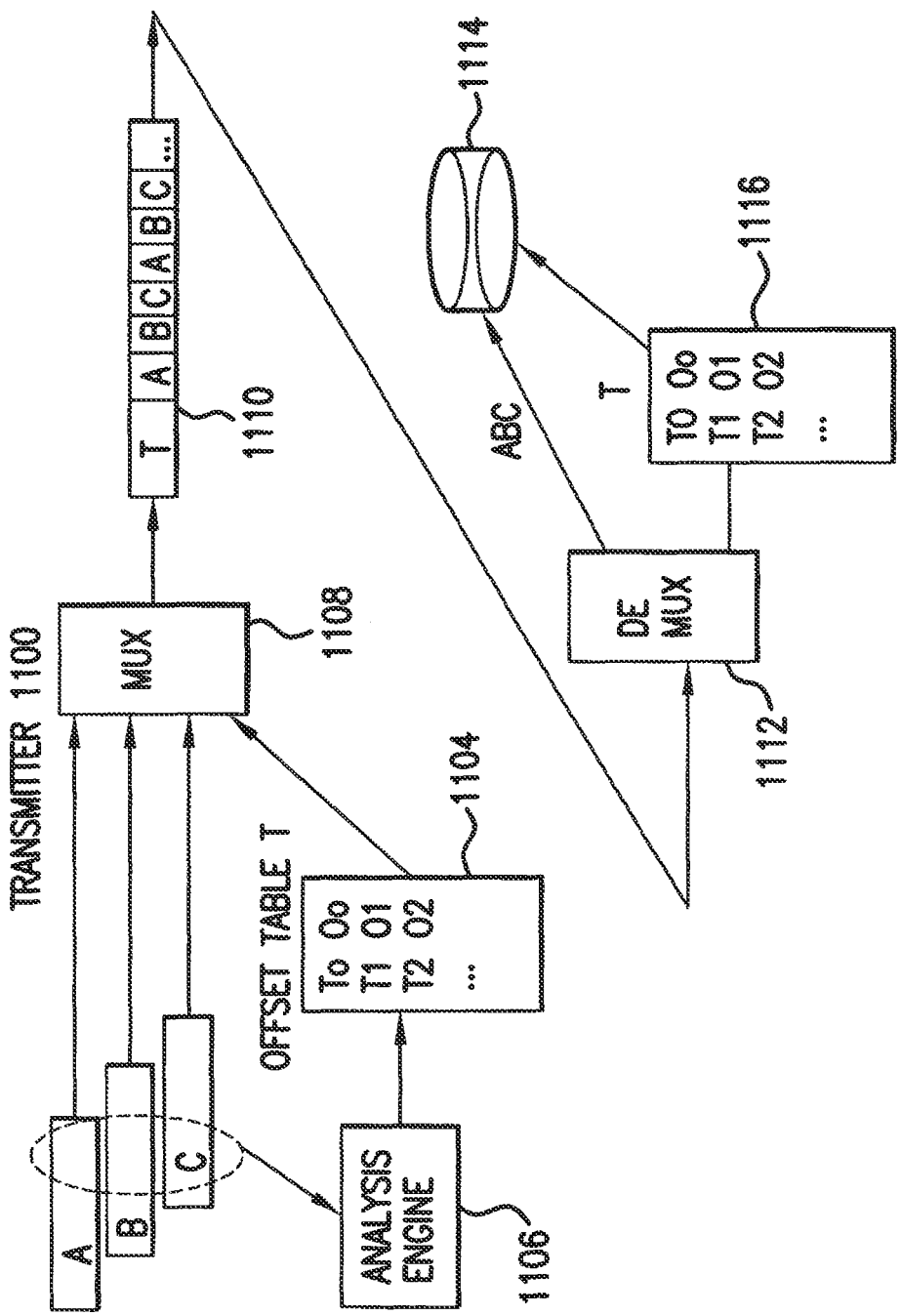
FIG. 11 illustrates a first process for determining the time and offset relationship for a variably dripped stream.

FIG. 11 illustrates a first process for determining the time and offset relationship for a variably dripped stream. The system shown in FIG. 11 includes transmission equipment 1100 and receiving equipment 1102. For the example shown in FIG. 11, three streams of data (A,B,C) are being dripped to a population of PVR's over a broadcast network. The Table of T's and O's is dripped to receivers along with each video program. FIG. 11 depicts a case were the Table 1104 is sent in its entirety prior to trickling the videos. However, it should be understood that the Table 1104 could be dripped slowly as well. Furthermore, for simplicity, FIG. 11 shows a single table 1104 for all three streams; however, the Table 1104 could have several T,O pairs, one for each stream, or multiple Tables could be sent. The Table is prepared by the Analysts Engine 1106, which calculates indices at the server side that provide a correspondence between normal play time and depth (e.g., in bytes) into either the individual streams (video, audio, etc.) or into a mixed transport/program stream that is going, to be dripped. In addition to time and offset calculations, the table may also include other information about the programming content. For example, the table may also include the parental rating of the content. The system could then block recording and/or playback of data that the viewer is not authorised to view. Note that the stream is generally dripped with the express purpose of being recorded for later use, so the broadcaster knows for which streams they want to calculate this information. This correspondence (e.g., the tables) is broadcast as meta-data along with the transport/program stream. It is also possible to send the tables separately through a return channel. Preferably, the tables are broadcast by sending the information first or sending it last, by "dripping" the table information by multiplexing it with the three streams of data at 1108.

On the set-top box at the receiver side, the dripped a/v/d/md (streamed data) 1110 is received, demultiplexed 1112, and recorded on a storage device 1114. At this time, a correspondence between depth into respective individual streams, or a mixed transport/program stream and location on the recording media is maintained. The broadcast correspondence between playtime and depth 1116 is also recorded on the recording media. Note that the recorded mixed transport/program stream need not be identical to the original broadcast one. It is also noted that the data need not be stored on the recording media contiguously, e.g., something similar to (paged, segmented) virtual memory tables could be used. When trick modes, e.g., fast-forward, rewind, etc., are requested, the normal playtime to which to jump is determined. Thereafter, the depth, is looked up, and using the depth, the location is determined and the content is fetched. In an alternative embodiment, the receiver could also pull the Table information from an on-line server over a 2-way communications link (not shown). It should be noted that the Table could be in a different format than described above. For example, a hash structure could be used, as well as other known data structures.

Figure 12:
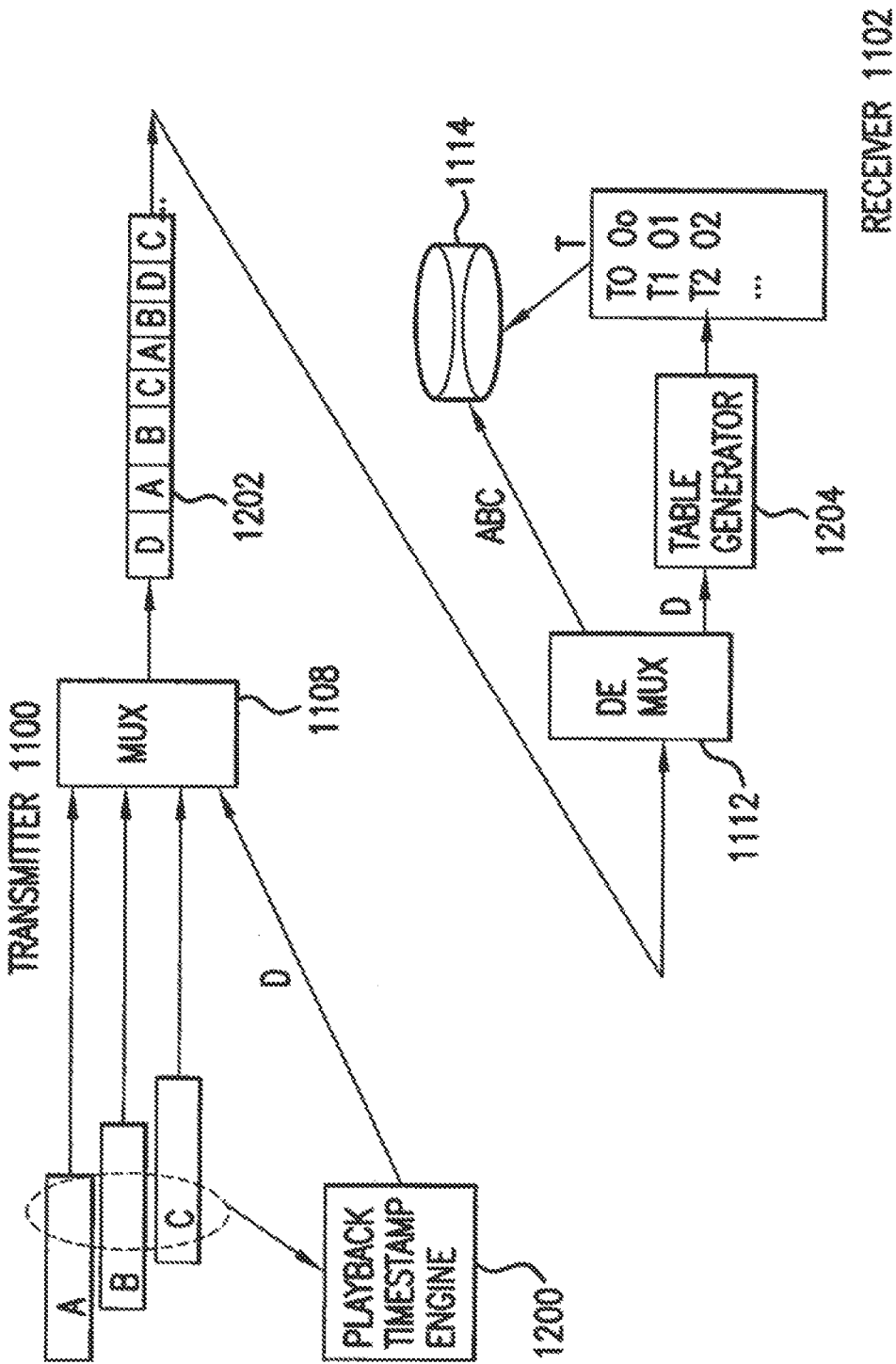
FIG. 12 illustrates a second process for determining the time and offset relationship for a variably dripped stream.

FIG. 12 illustrates a second process for determining the time and offset relationship for a variably dripped stream. The structure is the same as in the embodiment shown in FIG. 11. In this embodiment, however, the Analysis Engine 1106 is replaced by a Playback Timestamp Engine 1200. This component creates a timestamp packet that is multiplexed and dripped along with the video programs 1202, and the data within the packet is used to create the T,O pairs at the receiver side at 1204. If interactive applications are included with the video programs in the broadcast streams, preferably, the interactive applications are also time stamped.

The embodiment illustrated in FIG. 12 includes broadcasting intermixed within the program data (the individual streams or mixed transport/program stream), and time stamp information that indicates the normal play time of the data it is being mixed with. Two alternative methods of performing this method include a) ensuring that one of the individual streams includes program clock reference (PCR) information in its packets, or b) including an additional stream (a separate packet id (PID) when using MPEG transport) into a program designated to maintain the normal playtime. In the latter case, that stream is multiplexed into the other streams frequently enough to ensure a quality mapping of the correspondence between normal playtime and offset into the other stream data, but no so frequently that the overhead of collecting the information is problematic. For example, on MPEG based streams, it is necessary to ensure that packets that include the time base occur frequently in the mix.

On the set-top box, as the dripped a/v/d/md is received and recorded, whenever content is detected that includes time base information, an entry is added to the mapping from normal play time and offset into the stream data as it is saved. If the separate stream approach is used with MPEG transport, there is usually hardware that is able to filter on the PID of the time base stream and assist in collecting the data.

When trick modes are requested, the normal playtime in which to jump is determined by the system. Thereafter, the depth is looked up, and using the depth, the location is looked up and the content is fetched.

Figure 13:
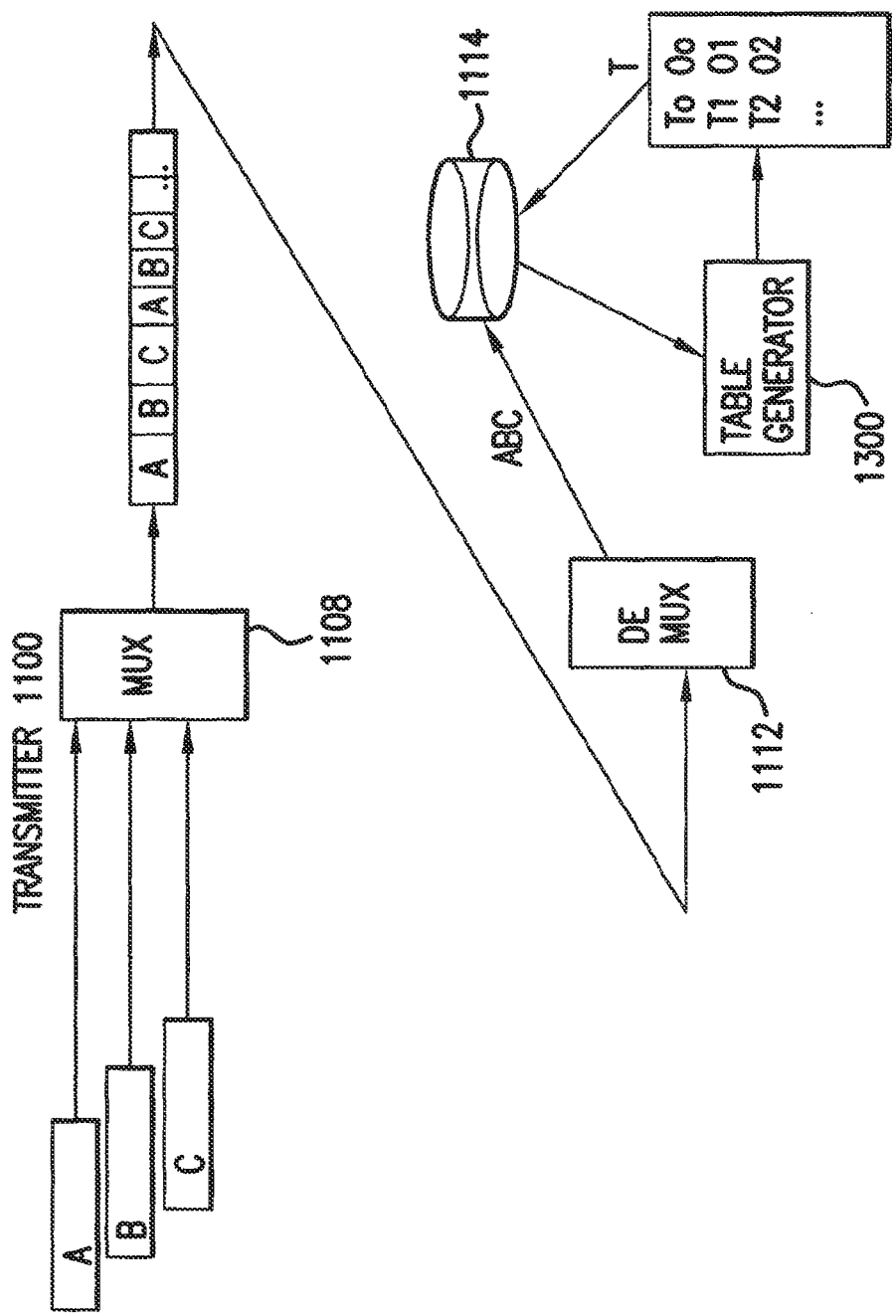
FIG. 13 illustrates a third process tor determining the time and offset relationship for a variably dripped stream.

FIG. 13 illustrates a third process for determining the time and offset relationship for a variably dripped stream. The structure of this embodiment is similar to the embodiments in FIGS. 11 and 12. In this embodiment, the algorithms run at the encoder can also be run at the receiver, directly or an equivalent thereto. In the third embodiment, the PVR stores the dripped program, and subsequently performs an analysis phase to build the Table. One way to perform this function is as follows. The dripped program is recorded. When the set-top box (note: as always, the set top box components and functionality could be built into the television or other consumer electronic (CE) device) is not busy, it could "play" A/V at the normal rate (though not display on the television) for purposes of calculating the correspondence between normal play time and location on the recording media to build a table 1300. Then, the correspondence could be used for trick modes. Other methods of building the table at the receiver side could also be implemented.

In alternative embodiments of the invention, if the stream is missed during recording because the viewer switched channels briefly or due to broadcast errors, the missing part could be requested later over a return channel or could be obtained from a scheduled re-broadcast, when the television was off, for example.

In still further alternative embodiments, the receiver could play back (during "off times") the video at normal speed while not presenting it on the display. In this way, the correspondences are computed using special purpose hardware to mark certain time increments in the video, for example. This may overcome the disadvantage of having to play back (at least a portion of) the video before trick mode becomes usable.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for controlling presentation of a media content item associated with an application, the method comprising:
   playing a first media content item for presentation to the user, wherein a first interactive application associated with the first media content item is available for interaction by a user during the playing of the first media content item;
   receiving, during the playing of the first media content item, a first indication that the user is interacting with the first interactive application;
   suspending, using at least one processor of a machine, the playing of the first media content item in response to the receiving of the first indication;
   receiving, during the suspending of the playing of the first media content item, a second indication that the user has stopped interacting with the first interactive application;
   resuming the playing of the first media content item in response to the receiving of the second indication;
   playing, during the playing of the first media content item, a second media content item located within the first media content item, wherein a second interactive application is available for interaction by the user during the playing of the second media content item;
   receiving, during the playing of the second media content item, a third indication that the user is interacting with the second interactive application;
   suspending the playing of the second media content item in response to the receiving of the third indication; and
   receiving, during the suspending of the playing of the second media content item, a fourth indication that the user has stopped interacting with the second interactive application.

2. The method of claim 1, further comprising:
   receiving, over a period of time, the first media content item; and
   recording, as the first media content item is received, the first media content item at least after the receiving of the first indication.

3. The method of claim 2, wherein:
   the playing of the first media content item occurs as the first media content item is received; and
   the recording of the first media content item at least after the receiving of the first indication comprises initiating the recording of the first media content item in response to the receiving of the first indication.

4. The method of claim 2, wherein the recording of the first media content item at least after the receiving of the first indication comprises recording an entirety of the first media content item as the first media content item is received.

5. The method of claim 1, wherein the suspending of the playing of the first media content item comprises pausing the playing of the first media content item.

6. The method of claim 1, wherein the suspending of the playing of the first media content item comprises replaying at least a portion of the first media content item.

7. The method of claim 6, wherein the portion of the first media content item being replayed comprises at least a portion of an advertisement.

8. The method of claim 1, wherein the resuming of the playing of the first media content item comprises restarting the playing the first media content item at a point in the first media content item at which the suspending of the playing of the first media content item occurred.

9. The method of claim 1, wherein the resuming of the playing of the first media content item comprises restarting the playing the first media content item at a point in the first media content item indicated by the user.

10. The method of claim 1, further comprising:
    presenting, during the playing of the first media content item prior to the first indication, the interactive application to the user; and
    continuing to present, without interruption, during the suspending of the first media content item, the first interactive application to the user.

11. The method of claim 1, wherein the first indication occurs in response to an answer from the user to an interrogatory presented by the first interactive application.

12. The method of claim 1, wherein the second indication occurs in response to a termination of the first interactive application.

13. The method of claim 1, wherein the second indication occurs in response to a command from the user to terminate the first interactive application.

14. The method of claim 1, wherein the second indication occurs in response to not receiving an input from the user over a predetermined period of time.

15. The method of claim 1, further comprising:
    detecting the first interactive application in the first media content item; and
    initiating execution of the first interactive application in response to the detecting of the first interactive application in the first media content item.

16. The method of claim 1, further comprising:
    detecting a trigger in the first media content item indicating that the first interactive application is to be executed;
    retrieving the first interactive application from a storage device in response to detecting the trigger; and
    initiating execution of the first interactive application in response to the retrieving of the first interactive application from the storage device.

17. The method of claim 1, further comprising:
    resuming the playing of one of the first media content item and the second media content item in response to the receiving of the fourth indication.

18. The method of claim 1, further comprising:
suspending execution of the first interactive application in response to the receiving of the third indication; and
resuming the execution of the first interactive application in response to the receiving of the fourth indication.

19. A media content device, comprising:
a content player configured to play a first media content item for presentation to the user via a display unit, wherein a first interactive application associated with the first media content item is available for interaction by a user during the playing of the media content item, the content player also configured to play, during the playing of the first media content item, a second media content item located within the first media content item, wherein a second interactive application is available for interaction by the user during the playing of the second media content item; and
a control unit configured to:
receive, during the playing of the first media content item, a first indication that the user is interacting with the first interactive application;
cause the content player to suspend the playing of the first media content item in response to the receiving of the first indication;
receive, during the suspending of the playing of the first media content item, a second indication that the user has stopped interacting with the first interactive application;
cause the content player to resume the playing of the first media content item in response to the receiving of the second indication;
receive, during the playing of the second media content item, a third indication that the user is interacting with the second interactive application;
suspend the playing of the second media content item in response to the receiving of the third indication; and
receive, during the suspending of the playing of the second media content item, a fourth indication that the user has stopped interacting with the second interactive application.

20. A non-transitory computer-readable storage medium comprising instructions that, when executed by at least one processor of a machine, cause the machine to perform operations comprising:
playing a first media content item for presentation to the user, a first interactive application associated with the first media content item is available for interaction by a user during the playing of the first media content item;
receiving, during the playing of the first media content item, a first indication that the user is interacting with the first interactive application;
suspending the playing of the first media content item in response to the receiving of the first indication;
receiving, during the suspending of the playing of the first media content item, a second indication that the user has stopped interacting with the first interactive application;
resuming the playing of the first media content item in response to the receiving of the second indication;
playing, during the playing of the first media content item, a second media content item located within the first media content item, wherein a second interactive application is available for interaction by the user during the playing of the second media content item;
receiving, during the playing of the second media content item, a third indication that the user is interacting with the second interactive application;
suspending the playing of the second media content item in response to the receiving of the third indication; and
receiving, during the suspending of the playing of the second media content item, a fourth indication that the user has stopped interacting with the second interactive application.

* * * * *

UNITED STATES PATENT AND TRADEMARK OFFICE
CERTIFICATE OF CORRECTION

PATENT NO. : 9,761,274 B2  
APPLICATION NO. : 14/268939  
DATED : September 12, 2017  
INVENTOR(S) : Delpuch et al.

Page 1 of 1

It is certified that error appears in the above-identified patent and that said Letters Patent is hereby corrected as shown below:

On the Title Page

On page 2, in Column 2, under "Other Publications", Line 34, delete "Apr. 18," and insert --May 18,-- therefor In the Claims In Column 20, Line 64, in Claim 17, delete "1 ," and insert --1,-- therefor In Column 21, Line 1, in Claim 18, delete "1 ," and insert --1,-- therefor In Column 22, Line 10, in Claim 20, after "user,", insert --wherein--

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*